(12) United States Patent
Canon et al.

(10) Patent No.: US 7,593,928 B2
(45) Date of Patent: Sep. 22, 2009

(54) DYNAMICALLY ALTERING SEARCH RESULT PAGE LAYOUT TO INCREASE USER RESPONSE

(75) Inventors: James Mark Canon, Washington, DC (US); David C. Sobotka, Redwood City, CA (US); David Pautler, Palo Alto, CA (US); Justin M. Law, Maple Valley, WA (US); Dimitre T. Piskyulev, Santa Clara, CA (US); Oliver Cahill, Tipperary (IE); Martin Boyle, Castleknock (IE); Ultan O'Carroll, Tipperary (IE); Harmannus Vandermolen, Sunnyvale, CA (US); Gregory Scott Pass, Reston, VA (US); Abdur Chowdhury, Oakton, VA (US); Shawn C. Rose, Palo Alto, CA (US); John McClean, Tallaght (IE); Amelia P. Williams, Denver, CO (US)

(73) Assignee: AOL LLC, Dulles, VA (US)

( * ) Notice: Subject to any disclaimer, the term of this patent is extended or adjusted under 35 U.S.C. 154(b) by 183 days.

(21) Appl. No.: 11/668,025

(22) Filed: Jan. 29, 2007

(65) Prior Publication Data
US 2008/0183672 A1 Jul. 31, 2008

(51) Int. Cl.
G06F 7/00 (2006.01)
G06F 17/30 (2006.01)
(52) U.S. Cl. ............................................. 707/3; 707/5
(58) Field of Classification Search ....................... 707/3
See application file for complete search history.

(56) References Cited

U.S. PATENT DOCUMENTS 5,717,923 A 2/1998 Dedrick
5,796,952 A 8/1998 Davis et al.
5,918,014 A 6/1999 Robinson
5,948,061 A 9/1999 Merriman et al.
6,014,638 A 1/2000 Burge et al.
6,047,310 A 4/2000 Kamakura et al.
6,108,637 A 8/2000 Blumenau (Continued)

OTHER PUBLICATIONS

"Windows 2000 server as a router," Specialty Forums on Computing. net, question on how to set up a Windows 2000 Server as a router submitted Jul. 8, 2002 with instructions to do so in responses submitted Jul. 9, 2002. Retrieved from http://www.computing.net/answers/networking/windows-2000-server-as-a-router/7827.html.*

(Continued)

*Primary Examiner*—James Trujillo
*Assistant Examiner*—Bruce M Moser
(74) *Attorney, Agent, or Firm*—Workman Nydegger

(57) ABSTRACT

Systems and methods are provided for providing content to be displayed to a user in response to a search request. One embodiment of a method includes identifying a page recipe comprising one or more page properties and one or more content module definitions, each content module definition defining an amount of content to be displayed in a content module to be displayed on a results page, the location of the content module to be displayed on the results page, and a content source from which to obtain content to be displayed in the content module, and using the page recipe to generate a results page to be displayed on a search client.

19 Claims, 7 Drawing Sheets

U.S. PATENT DOCUMENTS

| | | | |
|---|---|---|---|
| 6,285,987 | B1 | 9/2001 | Roth et al. |
| 6,334,110 | B1 | 12/2001 | Walter et al. |
| 6,421,706 | B1 | 7/2002 | McNeill et al. |
| 6,959,339 | B1 | 10/2005 | Wu et al. |
| 7,035,923 | B1 | 4/2006 | Yoakum et al. |
| 7,039,599 | B2 | 5/2006 | Merriman et al. |
| 7,072,984 | B1 | 7/2006 | Polonsky et al. |
| 7,155,508 | B2 | 12/2006 | Sankuratripati et al. |
| 7,200,590 | B2 | 4/2007 | Everett-Church et al. |
| 7,353,267 | B1 | 4/2008 | Cunningham et al. |
| 2001/0036182 | A1 | 11/2001 | Addante |
| 2001/0054001 | A1 | 12/2001 | Robinson |
| 2002/0004733 | A1 | 1/2002 | Addante |
| 2002/0046099 | A1 | 4/2002 | Frengut et al. |
| 2002/0072984 | A1 | 6/2002 | Rothman et al. |
| 2002/0099600 | A1 | 7/2002 | Merriman et al. |
| 2003/0009385 | A1 | 1/2003 | Tucciarone et al. |
| 2004/0123247 | A1 | 6/2004 | Wachen et al. |
| 2004/0186766 | A1 | 9/2004 | Fellenstein et al. |
| 2005/0154718 | A1* | 7/2005 | Payne et al. .................. 707/3 |
| 2006/0242139 | A1 | 10/2006 | Butterfield et al. |
| 2006/0242178 | A1 | 10/2006 | Butterfield et al. |
| 2007/0150347 | A1 | 6/2007 | Bhamidipati et al. |
| 2007/0208751 | A1 | 9/2007 | Cowan et al. |
| 2007/0271340 | A1 | 11/2007 | Goodman et al. |
| 2008/0109406 | A1 | 5/2008 | Krishnasamy et al. |

OTHER PUBLICATIONS

"Powerseek PPC Plug-In Manual," Author Unknown, Nov. 19, 2004 [online] [retrieved on Dec. 6, 2006], 4 pgs. Retrieved from the Internet: http://web.archive.org/web/20041119021954/http://www.focalmedia.net/ppc_manual/4_ppc.html.

"Microsoft to Announce AdWords Competitor," by Chris Richardson, Mar. 15, 2005, [online] [retrieved on Oct. 18, 2006], 4 pgs. Retrieved from the Internet: http://www.webpronews.com/printable.php.

"New Ask Jeeves Sponsored Listings Program Lets More Advertisers Buy Direct," by Danny Sullivan, Aug. 1, 2005, [online] [retrieved on Oct. 18, 2006], 3 pgs. Retrieved from the Internet: http://searchenginewatch.com/showPage.html?page=sew_print &id=3524141.

"Ask Jeeves' Sponsored Listings Portends Fragmentation of Search Marketing," by Charlene Li, Aug. 2, 2005, [online] [retrieved on Oct. 18, 2006], 4 pgs. Retrieved from the Internet: http://blogs.forrester.com/charleneli/2005/08/ask_jeeves_spon.html.

"Allfeeds Google Backfill," Author Unknown, Aug. 24, 2005 [online] [retrieved on Oct. 18, 2006], 2 pg. Retrieved from the Internet: http://www.theadminzone.com/forums/printthread.php?t=13512.

"Advertise your business on Google," Author Unknown, Date Unknown, [online] [retrieved on Oct. 18, 2006], 4 pgs. Retrieved from the Internet: https://adwords.google.com/select/Login.

"Keyword Tool," Author Unknown, Date Unknown [online] [retrieved on Oct. 24, 2006], 1 pg. Retrieved from the Internet: https://adwords.google.com/select/KeywordToolExternal?defaultView=2.

Home page for Findory.com, Nov. 2, 2004 [online] [retrieved on Dec. 6, 2006], 2 pgs. Retrieved from the Internet: http://web.archive.org/web/20041102024941/http://findory.com/.

"About Findory", Nov. 2, 2004 [online] [retrieved on Dec. 6, 2006], 1 pg. Retrieved from the Internet: http://web.archive.org/web/20041125040039/findory.com/company/.

"Unintrusive Customization Techniques for Web Advertising," by Marc Langheinrich, Atsuyoshi Nakamura, Naoki Abe, Tomonari Kamba, Yoshiyuki Koseki, Amsterdam, Netherlands, 1999, [online] [retrieved on Oct. 12, 2006], 19 pgs. Retrieved from the Internet: http://www.vs.inf.ethz.ch/publ/papers/www8-adwiz/.

Bibliography for "Unintrusive Customization Techniques for Web Advertising," by Marc Langheinrich, Atsuyoshi Nakamura, Naoki Abe, Tomonari Kamba, Yoshiyuki Koseki, as found on http://citeseer.ist.psu.edu/366379.html [online] [retrieved on Oct. 12, 2006], 2 pgs.

"Multi-Service Search and Comparison Using the MetaCrawler," by Erik Selberg and Oren Etzioni, © 1993, 1994, Nikos Drakos, Computer Based Learning Unit, University of Leeds, translation initiated by Erik Selberg on Oct. 9, 1995, [online] [retrieved on Oct. 12, 2006], 16 pgs. Retrieved from the Internet: http://www.w3.org/Conferences/WWW4/Papers/169/.

Bibliography for "Multi-Service Search and Comparison Using the MetaCrawler," by Erik Selberg and Oren Etzioni, © 1993, 1994, Nikos Drakos, Computer Based Learning Unit, University of Leeds, as found on http://citeseer.ist.psu.edu/selberg95multiservice.html [online] [retrieved on Dec. 6, 2006], 2 pgs.

"Optimizing Search by Showing Results in Context," by Susan Dumais, Edward Cutrell, and Hao Chen, © 2001, published in SIGCHI'01, Mar. 31-Apr. 4, 2001, 8 pgs.

Bibliography for "Optimizing Search by Showing Results in Context," by Susan Dumais, Edward Cutrell, and Hao Chen, © 2001, as found on http://citeseer.ist.psu.edu/dumais01optimizing.html [online] [retrieved on Dec. 6, 2006], 2 pgs.

"New Site Layout Influences Results for Bankrate.com," by Mickey Alam Khan, Jul. 12, 2004, [online] [retrieved on Nov. 27, 2006], 2 pgs. Retrieved from the Internet: http://www.optimost.com/press/071204.phtml.

"Should Yahoo Own Social Search and Rank in a Web 2.0 World?," by Thomas Hawk, Oct. 30, 2006, [online] [retrieved on Nov. 1, 2006], 2 pgs. Retrieved from the Internet: http://www.searchnewz.com/blog/talk/sn-6-20061030ShouldYahooOwnSocialSearchandRankinaWeb20World.html.

"Top 10 Search Results Guarantee," Author Unknown, Date Unknown, [online] [retrieved on Oct. 11, 2006], 2 pgs. Retrieved from the Internet: http://www.networksolutions.com/web-site-promotion/popup-search-engine-optimization-guarantee.jsp.

"Designing Web Ads Using Click-Through Data," by Jakob Nielsen, Sep. 2, 2001, [online] [retrieved on Oct. 12, 2006], 3 pgs. Retrieved from the Internet: http://www.useit.com/alertbox/20010902.html.

"The Science of Targeting," by Dawn Anfuso, Mar. 18, 2004, [online] [retrieved on Oct. 12, 2006], 3 pgs. Retrieved from the Internet: http://www.imediaconnection.com/global/5728.asp?ref=http://www.imediaconnection.com/content/3045.asp.

"Study Shows Target Demographics Important in Search Engine Marketing Campaigns," Author Unknown, May 18, 2004, [online] [retrieved on Oct. 12, 2006], 3 pgs. Retrieved from the Internet: http://www.searchenginejournal.com/?p=582.

"Optimizing Paid Search Advertising," by Kevin Gold, Nov. 9, 2004, [online] [retrieved on Oct. 12, 2006], 2 pgs. Retrieved from the Internet: http://content.websitegear.com/article/print.asp?id=ppc_effectiveness.

"Search advertising glossary of terms," Author Unknown, Aug. 6, 2004, [online] [retrieved on Oct. 12, 2006], 6 pgs. Retrieved from the Internet: http://web.archive.org/web/20040806065852/http://www.google.com/ads/glossary.html.

"MSN adCenter Joins Yahoo and Google in Search Advertising," by Greg Sterling, Mar. 17, 2005, [online] [retrieved on Oct. 12, 2006], 3 pgs. Retrieved from the Internet: http://www.searchenginejournal.com/?p=1438.

"The Decade in Online Advertising 1994-2004," by Rick E. Bruner, Apr. 2005, DoubleClick, Inc., 11 pgs. [www.doubleclick.com].

"Target Demographics, Before and After," by Rick E. Bruner and Kathryn Koegel, Jun. 2005, DoubleClick, Inc., 9 pgs. [www.doubleclick.com].

"Search Engine Strategies 2005 Conference & Expo Agenda Monday, Dec. 5, 2005," Author Unknown, Oct. 28, 2005, [online] [retrieved on Dec. 6, 2006], 5 pgs. Retrieved from the Internet: http://web.archive.org/web/20051028030050/www.jupiterevents.com/sew/fall05/agenda1.html.

"Search Engine Strategies 2005 Conference & Expo Agenda Tuesday, Dec. 6, 2005," Author Unknown, Oct. 28, 2005, [online] [retrieved on Dec. 6, 2006], 4 pgs. Retrieved from the Internet: http://web.archive.org/web/20051028030050/www.jupiterevents.com/sew/fall05/agenda2.html.

"Search Engine Strategies 2005 Conference & Expo Agenda Wednesday, Dec. 7, 2005," Author Unknown, Oct. 28, 2005, [online]

[retrieved on Dec. 6, 2006], 4 pgs. Retrieved from the Internet: http://web.archive.org/web/20051028030050/www.jupiterevents.com/sew/fall05/agenda3.html.

"Search Engine Strategies 2005 Conference & Expo Agenda Thursday, Dec. 8, 2005," Author Unknown, Oct. 28, 2005, [online] [retrieved on Dec. 6, 2006], 4 pgs. Retrieved from the Internet: http://web.archive.org/web/20051028030050/www.jupiterevents.com/sew/fall05/agenda4.html.

"Targeting Search Ads by Demographics & Behavior," Author Unknown, Feb. 27, 2006, [online] [retrieved on Nov. 28, 2006], 5 pgs. Retrieved from the Internet: http://www.seroundtable.com/archives/003379.html.

"Targeting Search Ads by Demographics & Behavior," by Greg Jarboe, Mar. 22, 2006, [online] [retrieved on Oct. 12, 2006], 3 pgs. Retrieved from the Internet: http://searchenginewatch.com/showPage.html?page=sew_print&id=3593236.

"Best Practices for Optimizing Web Advertising Effectiveness," by Rick E. Bruner, May 2006, DoubleClick, Inc., 14 pgs. [www.doubleclick.com].

"The Promise of Behavioral Targeting," by Bruce Clay, Aug. 24, 2006, [online] [retrieved on Oct. 12, 2006], 3 pgs. Retrieved from the Internet: http://www.searchengineguide.com/cgi-bin/mtview.cgi/75/entry/8277/print_version.

"Microsoft® adCenter Labs Presentation," Author Unknown, Jun. 11, 2006, [online] [retrieved on Dec. 6, 2006], 2 pgs. Retrieved from the Internet: http://web.archive.org/web/20060601184523/http://adlab.msn.com/demo.aspx.

*Internet Archive, Frequently Asked Questions*; http://www.archive.org/about/faqs.php; Dec. 6, 2006; 46 pages.

*About Citeseer*; http://citeseer.ist.psu.edu/citeseer.html; Dec. 6, 2006; 2 pages.

A Nifty Personalized News Site, by JD Lasica, Jan. 14, 2004, [online] [retrieved on Nov. 27, 2006], 10 pgs. Retrieved from the Internet: http://www.newmediamusings.com/blog/2004/01/a_nifty_persona.html.

"The Web Bug FAQ," by Richard M. Smith, Nov. 11, 1999 [online] [retrieved on Oct. 18, 2006], 4 pgs. Retrieved from the Internet: http://www.eff.org/Privacy/Marketing/web_bug.html.

"Software to Track E-Mail Raises Privacy Concerns," by Amy Harmon, Nov. 22, 2000 [online] [retrieved on Oct. 18, 2006], 9 pgs. Retrieved from the Internet:http//www.nytimes.com/2000/11/22/technology/22NET.html?ex=1165467600&en=df45f4346250d53f&ei=5070, http://www.nytimes.com/2000/11/22/technology/22NET.html?pagewanted=2&ei=5070&en=fd45f4346250d53f&ex=1165467600, and http://www.nytimes.com/2000/11/22/technology/22NET.html?pagewanted=3&ei=5070&en=fd45f4346250d53f&ex=1165467600.

"Technology Talk—Capturing Implied Response, a.k.a. Link Tracking," Author Unknown, May 2001 [online] [retrieved on Oct. 18, 2006], 2 pgs. Retrieved from the Internet: http://web.archive.org/web/20010702062409/http://www.netline.com/newsletter/h/techtalk05_01.html.

"The Hunt for Stats Tracking Email and Clear Pixels," by Keith Boswell, the Marketleap Report vol. II, Issue #14 - Part 2, Aug. 21, 2002 [online] [retrieved on Nov. 27, 2006], 4 pgs. Retrieved from the Internet: http://www.marketleap.com/report/ml_report_34.htm.

"More on Email Privacy," by Preston Gralla, Jun. 8, 2004 [online] [retrieved on Oct. 18, 2006], 3 pgs. Retrieved from the Internet: http://www.oreillynet.com/windows/blog/2004/06/more_on_email_privacy.html.

"Web Buggery: Analyzing Tracking Images," Author Unknown, Dec. 7, 2004 [online] [retrieved on Dec. 06, 2006], 7 pgs. Retrieved from the Internet: http://web.archive.org/web/20041207215656/irongeek.com/i.php?page=security/webbugs.

\* cited by examiner

| 400 | 402 Search Query Term: Madonna<br>403 Ranking: Hi | | |
|---|---|---|---|
| Recipe ID<br>405 | Demographic Condition<br>406 | Recipe Instructions<br>408 | |
| Recipe ID<br>Version ID<br>Developer User ID<br>Demographic Condition ID | Daytime | Base Page Template<br>Add Content Module<br>Add Content Module<br>Add Content Module<br>Add Content Module<br>Add Content Module | Hash Index   Section<br>106295   A1<br>410672   C1<br>321498   C2<br>260083   C3<br>491600   D1<br>394879 |
| Recipe ID<br>Version ID<br>Developer User ID<br>Demographic Condition ID | High Usage | Code For Page Property A<br>Code For Page Property B<br>Code For Content Module A<br>Code For Content Module B | |
| Recipe ID<br>Version ID<br>Developer User ID<br>Demographic Condition ID | High Usage | Code For Page Property A<br>Code For Page Property B<br>Code For Content Module B<br>Code For Content Module C | |

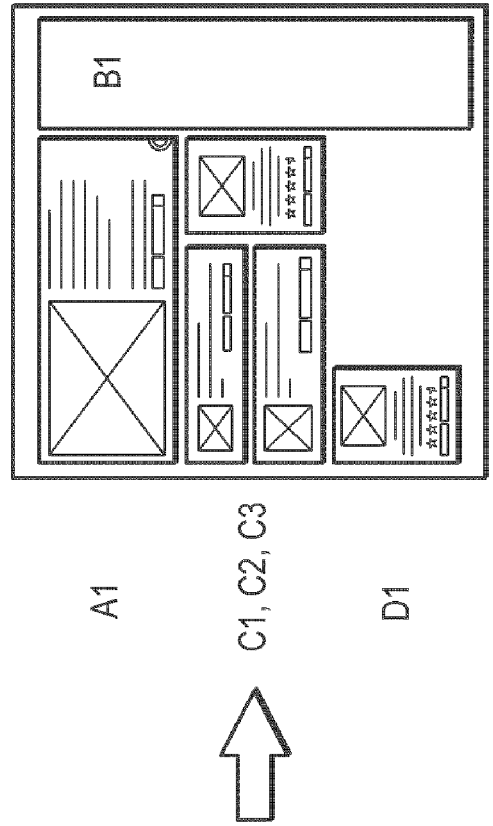
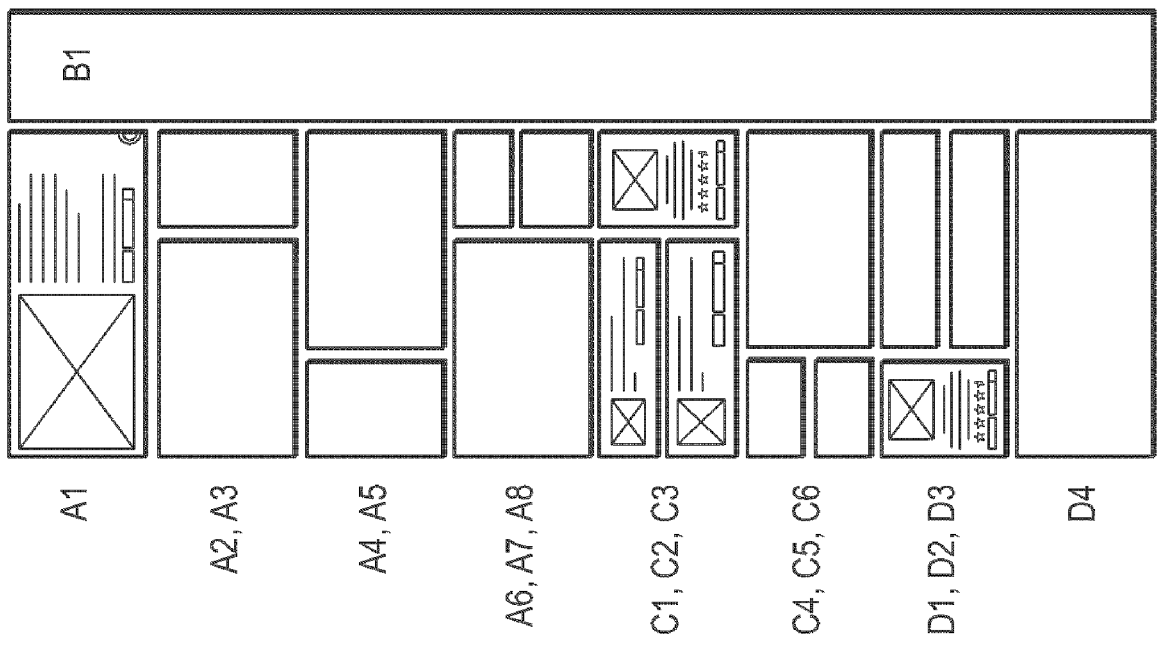
FIG. 4B

| Recipe Component IDs | 402 Search Query Term: Madonna  403 Ranking: Hi | | | |
|---|---|---|---|---|
| | Impressions 452 | CTR 454 | Conversions 456 | Hover Time Ave. 458 |
| Index ID  410672  321498  260083  491600  394879 | 134  148  137  155  162 | 25%  38%  44%  32%  49% | 15%  26%  29%  31%  34% | 8 Sec  11 Sec  15 Sec  21 Sec  17 Sec |
| Content Module A | 268 | 46% | 37% | 19 Sec |
| Content Module B | 321 | 42% | 30% | 16 Sec |
| Content Module B' | 346 | 53% | 41% | 20 Sec |
| Content Module C | 351 | 55% | 38% | 18 Sec |

450

404A: rows 1 (Index IDs)
404B: Content Module A, B
404C: Content Module B', C

DYNAMICALLY ALTERING SEARCH RESULT PAGE LAYOUT TO INCREASE USER RESPONSE

BACKGROUND OF THE INVENTION

1. The Field of the Invention

The present invention relates to systems and methods for optimizing search result page layouts. More particularly, the present invention relates to systems and methods for optimizing search page layouts in search engines based on positive and/or negative user response to presented content.

2. The Relevant Technology

Search engines present substantially the same layout in response to a search query time after time using standard keyword searches, keywords in web pages and tags, and contract negotiations, regardless of the situational or user context. Many search engines provide other content besides the search results, such as promotional material and sponsored links that correspond to search criteria. However, search engines still present the search content in the same areas of the search page regardless of the search context and based on contract negotiations. For example, the priority of displaying sponsored links is generally given to the sponsor that has the highest bid fee. However, displaying sponsored links strictly on a keyword matching basis does not always provide the most enticing sponsored links. Therefore, it would be beneficial to present search results content in the layout most optimal to the user to entice the user to interact with search content, such as, but not limited to, advertisements and other promotional material.

BRIEF SUMMARY OF THE INVENTION

These and other embodiments of the present invention will become more fully apparent from the following description and appended claims, or may be learned by the practice of the invention as set forth hereinafter.

Generally, the present invention includes systems and methods for providing content to be displayed to a user in response to a search request. In one embodiment, a method includes identifying a search request including a search query from a first client, identifying at least one category associated with the search query, identifying at least one content source associated with the at least one category, identifying a first page recipe comprising one or more page properties and one or more content module definitions, the content module definitions defining an amount of content to be displayed in a content module to be displayed on a first results page, the location of the content module to be displayed on the first results page, and a content source from which to obtain content to be displayed in the content module, wherein at least one of the content module definitions identifies the at least one content source associated with the at least one category, and using the first page recipe to generate a results page to be sent to the first client, the results page including one or more content modules to be displayed on the rendered results page.

In another embodiment, a method includes identifying a search request including a search query from a first client, identifying a first demographic condition associated with the search request, identifying a first page recipe associated with the first demographic condition, the first page recipe comprising one or more page properties and one or more content module definitions, the content module definitions defining an amount of content to be displayed in a content module to be displayed on a first results page, the location of the content module to be displayed on the first results page, and a content source from which to obtain content to be displayed in the content module, wherein at least one of the content module definitions identifies the at least one content source associated with the at least one category, and using the first page recipe to generate a results page to be sent to the first client, the results page including one or more content modules to be displayed on the rendered results page.

Yet another embodiment of the invention includes a system having (1) a front end module configured to receive a search request including a search query from a client, generate a first results page from a first page recipe, the first page recipe comprising one or more page properties and one or more content module definitions, the content module definitions defining an amount of content to be displayed in a content module to be displayed on the first results page, the location of the content module to be displayed on the first results page, and a content source from which to obtain content to be displayed in the content module, send requests to one or more content sources for content, receive content from the one or more content sources to incorporate in the first results page, send the first results page to the client, and receive performance metrics associated with user interaction with the first results page from the client, and (2) an optimization engine associated with the front end module, the optimization engine configured to identify the first page recipe based on demographic conditions, determine whether the performance metrics associated with the first results page exhibit an increase in performance metrics as compared to another page recipe for substantially the same search request, and, if so, use the same first page recipe in response to a subsequent substantially same search request.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 4A illustrates an exemplary data structure for associating information for a search query, according to one embodiment of the invention.

FIG. 4B illustrates an exemplary page template structure for associating content modules with grid sections of the page template and collapsing empty grid sections when rending the results page.

FIG. 4C illustrates an exemplary data structure for associating performance metrics with page recipe versions, according to one embodiment of the invention.

DETAILED DESCRIPTION OF VARIOUS EMBODIMENTS

In the following detailed description of various embodiments of the invention, reference is made to the accompanying drawings which form a part hereof, and in which are shown by way of illustration specific embodiments in which the invention may be practiced. It is to be understood that other embodiments may be utilized and content module changes may be made without departing from the scope of the present invention. The present invention extends to methods, systems, computer program products, and data structures for efficiently optimizing the layout of a results page for search engines or other user interfaces. The embodiments of the present invention may include one or more special purpose or general-purpose computers, as discussed in greater detail below.

When a conventional search engine page receives a search request input by a user into a keyword search field, a conventional search engine returns the search results based on conventional search criteria which is typically dictated by contract negotiations and displays or renders the search results according to conventional methods such as listing the search results by relevancy, paid placement, and the like. It is difficult to know for these static types of search requests whether brand marketing is effective and whether a user is experiencing satisfaction in the type of content that is returned to the user.

Figure 1:
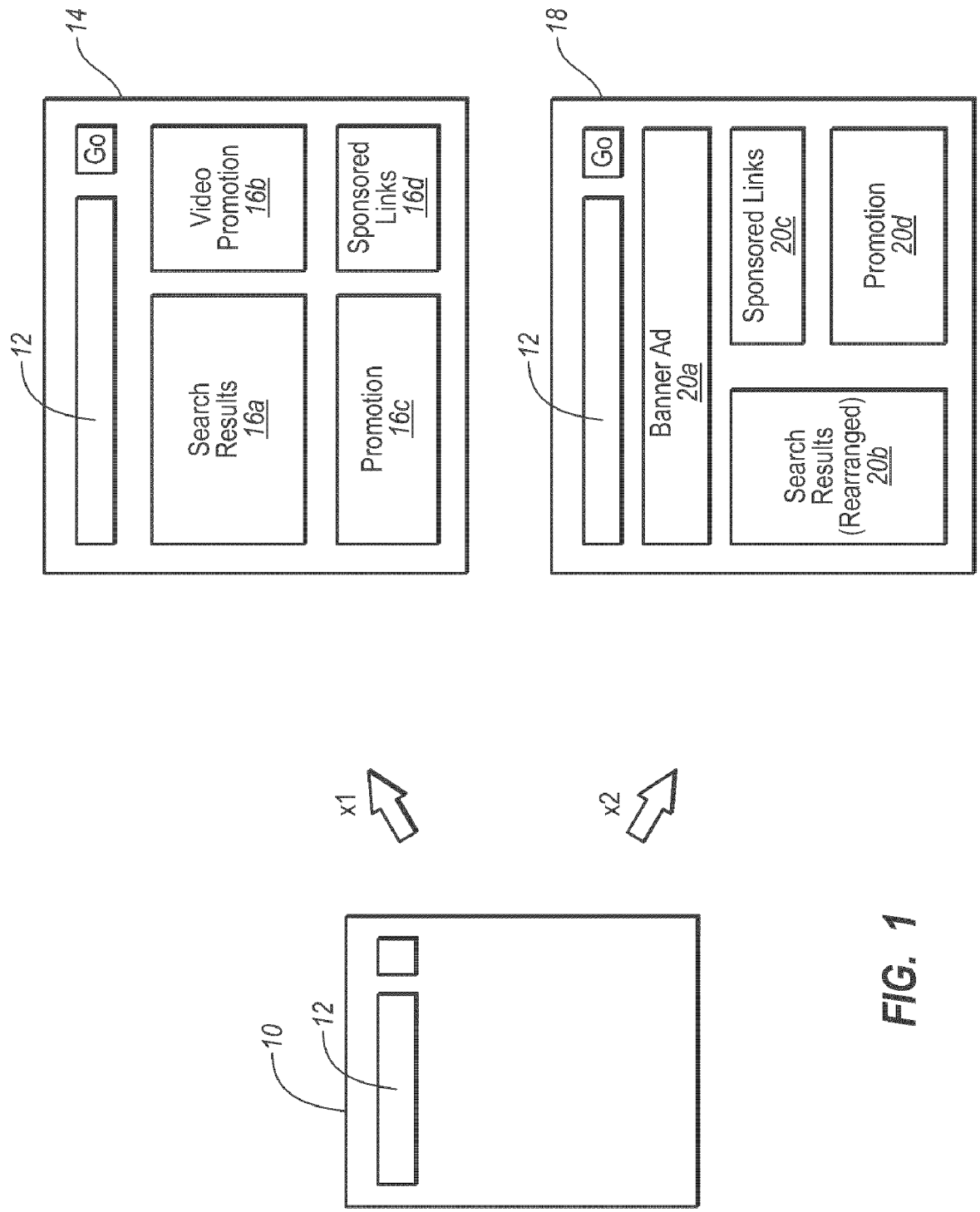
FIG. 1 illustrates a search engine input page and a results page that is rendered at a client based on two subsequent searches for substantially the same search query.

Thus, it would be desirable to know which features or interface components of a search page encourage more use of the search product over time. The present invention enhances the ability to gather user information that can be continuously used to improve search results, minimize risk associated with large changes and save valuable time for business and product owners. As shown in FIG. 1, embodiments of the present invention allow for a search request to be made into a keyword search field 12 of a search engine page 10 and provide electronic content such as search results and other content, such as, but not limited to, any articles, feeds, advertisements, sponsored links, banner advertisements, music links, news headlines, video clips, images, photographs, and the like, in any format including text, graphics, audio, visual, rich media, and the like, in a search results page 14 that includes a layout configured in a manner that elicits user interaction. As described in more detail below, the page 14 includes one or more content modules 16a, 16b, 16c, 16d, each content module displaying electronic content. Each content module is defined by 1) the actual content itself; 2) the location on the page on which the electronic content will appear; and 3) the amount of content to be displayed in the content module.

The present invention contains learning mechanisms for determining what content should be displayed in each content module, where the content module should be located on the page, how large the content module should be displayed, among other factors that are likely to elicit user interaction with at least a portion of page 14. Thus, the second time the same or different user inputs the same or similar search query into keyword search field 12, depending on the past user interaction that search results page 14 and other similar pages received, a different search results page 18 may be rendered, having content modules 20a, 20b, 20c, displayed with electronic content, but which may have different content, be located on a different area of the page, and have a different amount of content than content modules found on a previous version of search results page 14.

Content can be obtained from one or more "content sources." Usually, although not required, the content for a particular module is obtained from a single content source. Content sources include various suppliers of informational content including, but not limited to, information from broad-based websites (e.g., Yahoo, MSN, AOL), news websites (e.g., CNN, New York Times), information from more narrow-topic websites (e.g., vertical channel site, blogs), promotional material (e.g., from Google, Ingenio, Overture, ad.com), and the like. Thus, content includes any articles, feeds, advertisements, sponsored links, banner advertisements, music links, news headlines, video clips, images, photographs, products, polls, message boards, and the like, in any format including text, graphics, audio, visual, rich media, and the like. The content can include links (whether visible or not) that, when selected, redirect a user to another content piece, such as a web page, a sponsored link, a video clip, an audio stream clip, a popup advertisement, and the like.

In order to render a page, a "page recipe" is generated that defines one or more "page properties" and one or more "content module definitions." One or more page properties defines basic page characteristics such as, but not limited to, a header, a footer, graphics, colors, fonts and other non-content aspects that are displayed regardless of the content. The page properties may also identify spatially where one or more content modules may be inserted. In one embodiment, the page properties may identify a grid layout in which all published content will be assigned to a section and position in the grid upon generation of the search results page. In one embodiment, the number of sections within the grid can remain fixed and may allow for vertical expansion. The page properties code logic can determine which sections are associated with content modules and generate the appropriate module layout. In some cases, grid sections may be collapses if no content module is associated therewith, with adjacent content modules overlapping them, or empty grid sections may simply be left blank. The page properties should also account for the possibility that the content modules may have variable heights and width, as discussed below.

In contrast, the content module definitions define characteristics for each content module that will be displayed in the page such as location on the page, the amount of content of the content module windows and/or content source. In one embodiment, all of the content sources of the content modules can relate to the same general category as determined based on the original search request from a user. In another embodiment, the content sources can be selected based on different categories, each content source being selected using different keywords such that the final displayed page contains content that can vary greatly from the other content on the page, but which are of interest to the user.

Optimization includes selecting the content source, placement, and/or amount of content of content modules to form an optimized page recipe used to render a page to a user in a manner which elicits greater user interaction. As used herein, the term "optimize" is used to refer to the process for determining factors which lead to an increase in user response to a page or portions of a page versus a status quo or decrease in user response. Thus, in the present invention, the term "optimize" is not necessarily used to define a "best" result, but a desired increase in results which can, in some cases, actually be the best result. Additionally, the present invention provides a low-risk way for businesses and product owners to identify potential negative responses to content early on and adjust product strategies and/or tactics as needed. Therefore, the optimized page recipe may be different from a page recipe for rendering search results based strictly on the search request alone (i.e. a base page recipe, which is a page that is generated based strictly on keyword matching and contract negotiations). The present invention includes optimization processes between receiving the search request and rendering the results page.

In addition, optimization may occur on the sub-component level. For example, a content module displaying sponsored links might have optimization processes in determining what type of sponsored links and the order in which the sponsored links are displayed. This sub-optimization may also be considered in determining the location and number of sponsored links in the page recipe. For example, if the sponsored link content module does include sub-optimization processes, it may be displayed higher on the page and include more sponsored links than a sponsored link content module that is not sub-optimized.

The present invention also includes predictive analysis that is verified over time. Using the present invention, multiple searches for a particular query result in the system suggesting various versions of a page recipe, including varied content and layout, in order to determine factors that influence a user's interaction with a page. Over time, for a particular search query, one or more page recipes are determined to be more optimal to present to a user than other pages. In other words, the content modules of the page (i.e. their content, placement, and amount of content) may be modified compared to what would normally appear in a conventional search page in order to elicit greater user response to the content contained therein (as compared to the response that the conventional search page would be expected to elicit). The benefit of providing optimized page recipes will be a better overall experience for the user, as measured by the user response to the page. Naturally, an added benefit from increased user response to the page may be increased advertisement revenue.

Thus, one embodiment of the invention contemplates that one or more versions of a page recipe may exist in order to identify the page recipe that elicits an increase in response. In one embodiment, a page recipe version can be based from a base page recipe. In addition, in one embodiment, multiple page recipe versions can exist for a particular search query, with each page recipe being tied to particular demographic conditions. For example, search results page 14 and 18 shown in FIG. 1 may be considered to be versions of each other because they are produced as a result of the same or similar search query. In one embodiment, versions of page recipes can be developed and tested by a developer user to determine how that page recipe version performs as compared to other page recipe versions.

Recipe versions include varying page properties or content module properties of a base page recipe. A page property may be updated for instance to change the name of the page title or a CSS reference, while a content module property modification may be to add or remove a content module from a page recipe or modify a content source, amount of content of content module window, or location of content module window in a content module definition. Because a page recipe is used to render a corresponding results page, the terms "page recipe version" will imply that the search results page was rendered using a corresponding page recipe version. Where a developer user defines a page recipe version, the developer user may also define demographic conditions around which that page recipe version should be used as a starting point for determining optimization.

When determining the effectiveness of a page recipe, various performance metrics may be monitored and evaluated, such as, but not limited to, the number of impressions, the click-throughs, the conversions, the amount of hover time, etc. of a particular portion of the results page such as, but not limited to, a content module. The present invention also includes systems for obtaining and analyzing such performance metrics.

As shown in FIG. 1, system 100 can include one or more users accessing system 100 through one or more clients 102. As used herein, the term "user" can refer to a person performing a search request on client 102. Where a user is a person performing a search request, the client 102 represents a system at which a user can access a search application, which is rendered by a front end module 104. As such, client 102 may also include a browser application or other application suitable for making a network call to a remote search application 103 located on front end module 104. A user can also refer to administrative users with design, editorial and administrative roles and varying levels of access. For example, a user may have rights to manage recipes and assign other users to varying levels of access. An editorial user may have rights to assemble and schedule pages. A user also encompasses an administrator who manages the system 100, including assignment and deployment of components.

Front end module 104 is responsible for receiving a search request via request module 105 and then ultimately sending the optimized search results page to client 102 via a content rendering engine 106. The content rendering engine 106 uses an optimized page recipe and obtains the content as instructed in an optimized page recipe to generate an optimized search results page. That is, the content rendering engine 106 will send requests to one or more content sources 108 to obtain content to be displayed in one or more content modules.

In addition, where content sources 108 are searched in parallel, one embodiment of the invention provides a backfill mechanism 110 to provide alternative content if the search request to one or more content sources 108 fails for some reason. As such, front end module 104 includes a main controller 112 and one or more subcontrollers 114a, 114b. The main controller 112 analyzes the page recipe and iterates through the content module definitions, determines the relevant subcontroller 114 to use for each content module depending on the search requests for content. The main controller 112 then dispatches a list of content sources and associated filters for a content module to the relevant subcontroller 114 to process.

Subcontrollers 114a, 114b can be the same or different types of subcontrollers. In one embodiment, a default subcontroller 114a provides parallel content source searches and a cascade subcontroller 114b provides sequential content source searches. In one embodiment, a content module definition may nominate a certain subcontroller 114a, 114b. If no sub-controller is explicitly nominated then the default will be the sub-controller 114a, 114b that provides available parallel content source search functionality.

In the case of the default subcontroller 114a, a request to each content source specified in the list from the main subcontroller 112 will be executed (i.e., scheduled) and will apply the relevant filters to each content source. The cascading subcontroller 114*b* will differ from the default subcontroller 114*a* in that a request will only be executed (i.e., scheduled) on the first content source in the list. The default subcontroller 114*b* will check for the success of the content source. In the case of content source failure the cascading subcontroller 114*b* will dispatch a request to the next content source in the list.

In one embodiment, the subcontrollers 114*a*, 114*b* process the content source requests at a module level. That is, each content module will have its content sources searched within its own list, rather than all content sources being searched within one overall list. In another module, subcontrollers 114*a*, 114*b* combine the content module source requests in one overall list. Regardless of what subcontroller 114*a*, 114*b* is used for a module, it should not block the flow of control in the master controller 112. Subcontrollers 114*a*, 114*b* operate on an asynchronous fire-and-forget mechanism. Optionally, the main controller 112 may determine whether all modules have completed if a page recipe has inter-module dependencies.

In one embodiment, a filter 116 may be used to filter out certain unwanted content that is returned by content rendering engine 106 from a content source 108. In one embodiment, a content module definition can identify a particular filter parameter. In another embodiment, all content for all content modules may be filtered using the same parameters to ensure that the content on the entire results page conforms to filter specifications. Filter parameters can be preset or can be specified by a user.

One or more routers 118 exist to receive search requests from the front end module 104. The router 118, in turn, sends the search request to the optimization engine 126 for identifying one or more optimized page recipes used for preparing the search results page including search results along with other ecommerce results in the layout that will likely elicit the most user response. In one embodiment, the optimization engine 126 sends a plurality of optimized page recipes for a particular search query, each of which is specific to a particular demographic condition. Router 118 includes a rules engine 120 that contains logic to determine certain demographic conditions for a user 102 and select the appropriate optimized page recipe returned from optimization engine 126 for those conditions. For example, a user in the Eastern time zone will have a different demographic conditions than a user on the Pacific time zone. In addition, other known demographic information such as gender, age, and interests, can also be taken into account in selecting the optimized page recipe.

The router 118 selects the appropriate version of a page recipe. In some embodiments, this includes generating a page recipe using recipe generator 122. That is, selecting a page recipe from the optimization engine 126 may actually include selecting instructions for generating a page recipe. The instructions will contain identification of various components to be used to generate the page recipe. In one embodiment, one or more of the components could be stored in a cache 124 at router 118. Components can include a template of a base page recipe, stored content module definitions, stored page properties, and the like. For example, instructions for generating a page recipe may include identification of a base page recipe that is stored at cache 124 along with instructions to modify existing modules, delete existing modules, and/or add modules to the base page recipe.

In one embodiment, the page recipe instructions are configured as a hash of IDs, which the router 118 uses to search cache 124 for one or more components of the page recipe as identified by the IDs. In one embodiment, cache keys will be a combination of one or more of, but not limited to, recipe ID, version ID, developer user ID and demographic condition ID. This allows for parallel development of page recipe versions without version collision. In another embodiment, router 118 will resolve each optimized page recipe independently from separate caches.

In one embodiment, it is possible for front end module 104 to bypass router 118 for incoming search requests and send them directly to optimization engine 126. Turning now to the optimization engine 126 in more detail, optimization engine 126 defines for a particular search request various page recipe versions pertaining to one or more demographic conditions. In one embodiment, each page recipe version is an actual page recipe that defines one or more page properties and one or more content module definitions that result in a particular page layout. In another embodiment, the page recipe version may comprise one or more instructions that provide directions for generating a page recipe. For example, a page recipe version may identify a base page recipe, and changes to be made to the base page recipe, which are processed at router 118 by recipe generator 122, resulting in a page recipe.

Figure 2:
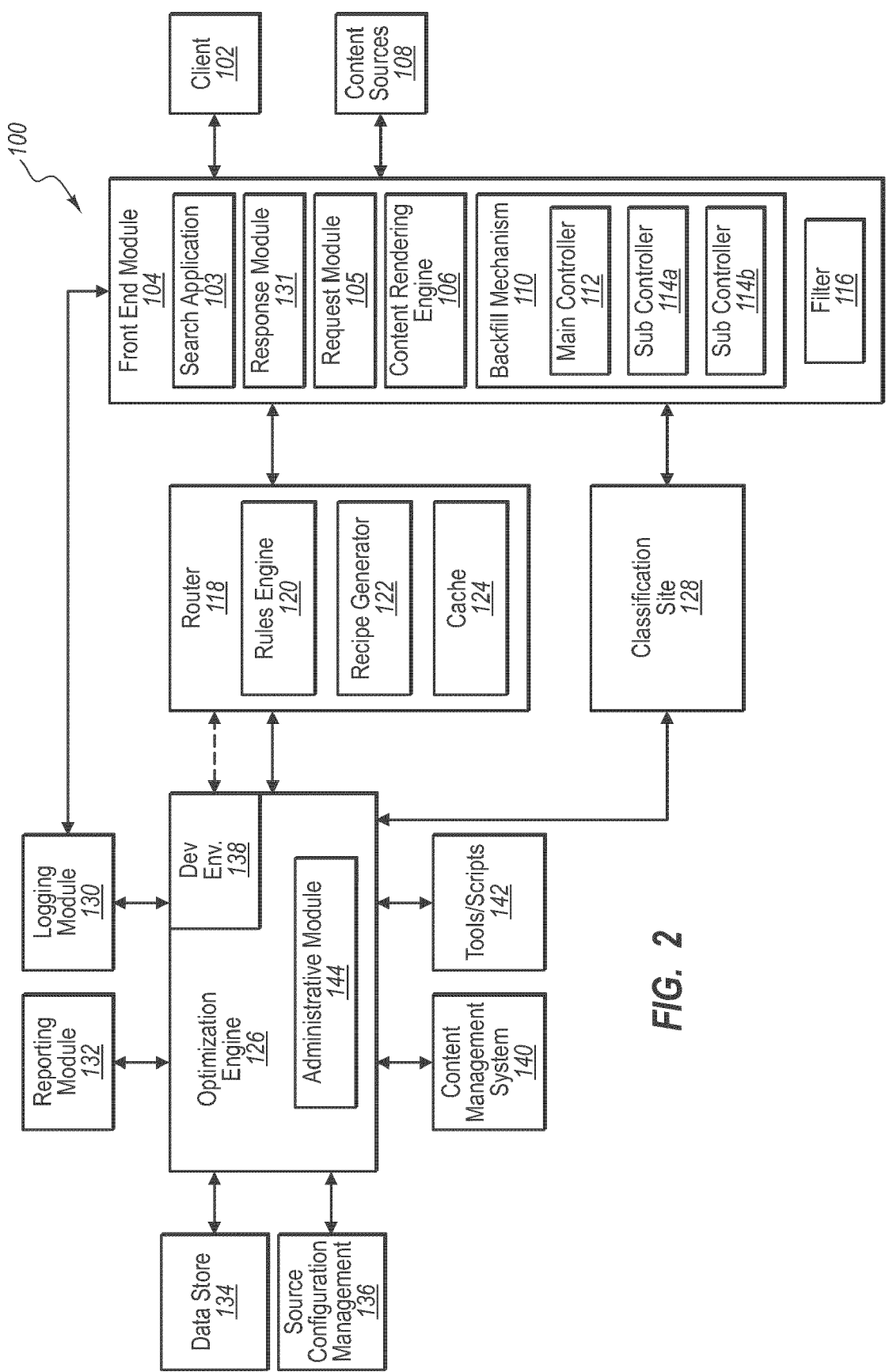
FIG. 2 illustrates an exemplary software architecture for implementing methods and systems of the present invention, according to one embodiment of the invention.
Figure 3:
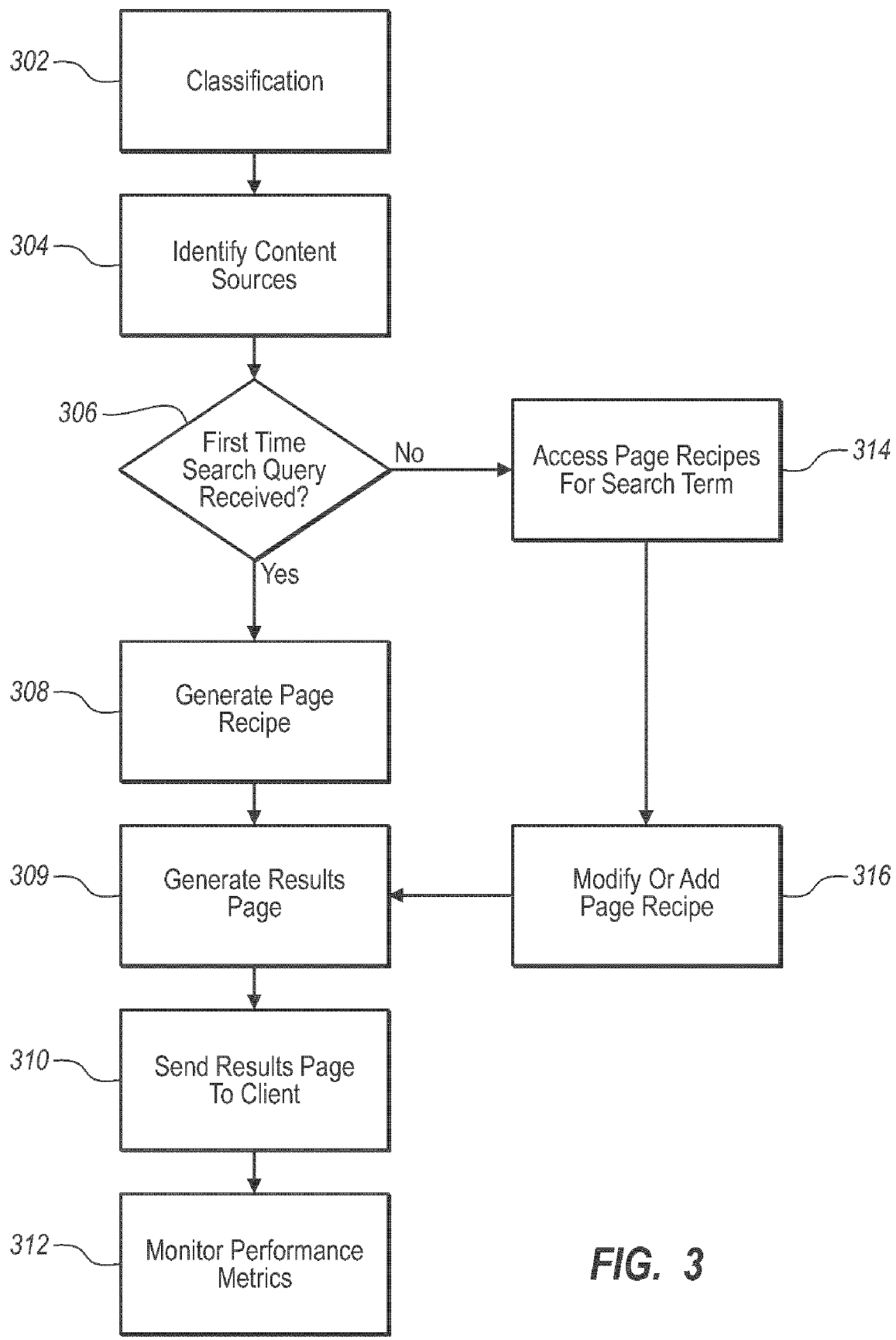
FIG. 3 illustrates an exemplary method for providing content in response to a search request, in accordance to one embodiment of the invention.

FIG. 3 illustrates the steps that the optimization engine takes when it receives a search request. When a search request is made, at 302, using the search query of the search request, the search request is classified into one of roughly 1000 categories. In order to accomplish this, as shown in FIG. 2, optimization engine 126 may be connected to one or more classification sites 128 (e.g., findanything.com, Catmandu.com) to determine general classifications or categories under which the particular terms of the search request falls. As shown in FIG. 2, classification site 128 is shown separately simply to illustrate its distinct functionality. However, classification site 128 can be combined with any other component of system 100. In addition, in one embodiment, classification site 128 can be hosted by a third party and accessed via network calls. In another embodiment, front end module 104 can be connected to classification site 128 so that when a search request is received, it requests classification of the search request from the site 128 and sends the classification with the search request to router 118. For example, the classification site can identify a topic and/or task associated with the search query. The same or another third party classification site can identify one or more synonyms for the search query. During classification, the search request may also receive a search request ranking (e.g., hi, medium, lo) using the same or different classification site 128. The search request ranking will be passed on to optimization engine 126 for use to generate one or more recipe versions relating to the search request. For sponsored link content, the classification site 128 can also determine the number of ads to be placed in a content module displaying sponsored links.

Next, at 304, the optimization engine 126 identifies potential content sources related to the category. This can include identifying one or more content module definitions associated with a content source. Associating the search request with a broader category rather than a specific keyword allows the optimization engine to broaden the potential content sources known to provide information on that category, and hence, the possible content modules for displaying the content sources. Category information may also be supplemented with demographic information such as date and time, geography, past searches, and user profile information. Any and all of this demographic information can be used to select a particular content module definition that is associated with the content source and/or category.

At 306, the optimization engine 126 determines whether this is the first time this particular search request has been received and whether a particular demographic condition has been associated with the search request before. At 308, if it is the first time a search request with a particular search query has been received, the optimization engine 126 generates a page recipe version for that search query and associates the search query with a particular demographic condition, if such information is available.

As shown in FIG. 4A, an exemplary table 400 holding information associating page recipe versions with demographic conditions is depicted. The table 400 is associated with one or more terms in a search query 402. The search query 402 can also be associated with a ranking 403. The search query 402 can be associated with one or more recipe versions 404A, 404B, 404C. Each page recipe version 404 can be identified with a recipe ID, illustrated in column 405. As discussed above, a page recipe version can be identified by one or more of, but not limited to, recipe ID, version ID, developer user ID and demographic condition ID, as shown in column 405 for each of recipe versions 404A, 404B, 404C. While not shown, the table 400 may also include a "default" page recipe version as a fallback. In another example, a default page recipe version may be presented to a certain percentage of users while a test page recipe version is presented to another percentage in order to ascertain the effectiveness of the test page recipe version.

In addition, each page recipe version 404 can be associated with demographic conditions, as shown in column 406. For example, the demographic conditions 406 may define different user segments (e.g., daytime version, a high usage version, etc.). Demographic conditions 406 may also define characteristics of users, such as gender and age (e.g., women over 40). For example, a search query may mean different things to different user groups. The term "Madonna" may have a different connotation to older users versus younger users. For a particular query, the same demographic condition may also be associated with multiple page recipes, for example, where a developer user wants to test one version of a page recipe for a particular demographic condition, or where two page recipes result in equally effective user response for the same demographic condition. The page version usage can also be limited by time, date, age, location, gender, and other demographic factors. In some cases, demographic conditions can be defined by broader categories such as, but not limited to, kids, teens, broadband connection, dialup connection, small business, ethnic groups, light/medium/heavy search users, and the like, wherein the optimization engine determines whether the demographic information associated with a search request falls within one or more of these demographic categories.

While not shown in the drawings, other restrictions may also apply to a particular page recipe version in order to test the effectiveness of that page recipe version. For example, a traffic percentage can be defined to indicate the percentage of incoming traffic for a search query term 402 that corresponds to the demographic condition 406 that should be presented with the page recipe version. A traffic threshold can be defined to identify a minimum number of requests or a certain number of users (e.g., as identified by IP address) that must be received for that search query term 402 and demographic condition 406 before using a particular page version. The page recipe version can also be invoked randomly, a fixed number of times, or strictly by user opt in. The page version can also be given expiration dates, certain date ranges of active status, and the like.

In addition, each page recipe version 404 is defined by recipe instructions 408. In one embodiment, recipe instructions 408 may include instructions (represented by block 408A) on how to generate a page recipe including identifying a hash index containing a hash ID for a base page recipe template and/or one or more content module templates. For example, the instructions 408 can identify one or more templates from which to generate a page recipe, including modifying one or more content module definitions of a page recipe template, and/or adding/deleting one or more content module definitions to or from the page recipe template, and referring to the component using a hash ID or other means for facilitating lookup of that component. In addition, as shown in block 408A, each content module can be associated with a section of the page template. In another embodiment, recipe instructions 408 may include the code (represented by block 408B) that actually defines code for page properties and one or more content modules.

In one embodiment, a user developer can define a page recipe version 404 for a particular search query 402 associated with a set of demographic conditions 406 and instructions 408 instead of the optimization engine 126 creating it via statistical probabilities. For example, suppose a developer user wants to test a page recipe version 404C as compared to page recipe version 404B for the same demographic condition. The developer user may choose to modify the content modules as shown in FIG. 4A and then test page version 404C for a certain percentage of the search requests received for the search query 402 and demographic condition associated with page recipes 404B, 404C.

Returning to FIG. 3, if this is the first time a search query has been received for a particular demographic condition, the optimization engine 126 adds a page recipe version (e.g., recipe version 404A) associated with the search query 402, defines the corresponding recipe ID information 405, demographic conditions 406 and instructions 408 for that page recipe version.

The optimization engine 126 sends the page recipe table 400 to router 118 for the router 118 to select the appropriate page recipe version that corresponds to the demographic condition. This can include generating the page recipe if the code is not fully contained in the instructions 408, for example, using templates as discussed above. At 309, the router 118 sends the page recipe to front end module 104 to generate the results page from the page recipe. This can include accessing the content from one or more content sources 108. At 310, the results page is sent to client 102 to render the results page to a user.

As discussed above, in one embodiment, the content modules identified in the page recipe version can be associated with a grid of a page template. FIG. 4B illustrates a page template 420 having various sections identified in a grid (A1, A2, A3, A4, A5, B1, C1, C2, C3, C4, C5, C6, D1, D2, D3, D4). FIG. 4B graphically depicts the content modules being associated with sections A1, C1, C2, C3 and D1 of the page template 420. FIG. 4B also shows that during rendering the code of the page template identifies which sections are not being used and collapses the sections during rendering in rendered results page 422.

At 312, the optimization engine 126 also monitors performance metrics of user interaction with the results page, which can be associated with the page recipe version. FIG. 4C illustrates an exemplary table 450 for storing performance metrics associated with page recipes 404A, 404B, 404C. Table 450 may store various performance metrics such as, but not limited to, the number of impressions 452, the click-throughs 454, the conversions 456, the amount of hover time 458, and the like, of a particular portion of the first results page such as, but not limited to, a content module.

Performance metrics 450 can be stored in the same or different location as table 400 holding page recipe instructions. In one embodiment, as shown in FIG. 2, optimization engine 126 can access logging module 130 to identify performance metrics 450 for a particular search query 402 on which to base optimization algorithms. Performance metrics can be monitored by client 102, which sends the performance metrics to front end module 104. A response module 131 at front end module 104 forwards the performance metrics to logging module 130. Other configurations for monitoring and/or sending performance metrics to logging module 130 will be understood by those of skill in the art. Logging module 130 maintains search logs that track performance metrics for a particular page recipe version. For each search request, search logs maintain a record per module to indicate if the content module was displayed, the location of the page in which it was displayed, the amount of content of the content module, etc. In addition, for each content module, search logs maintain performance metrics, such as, but not limited to, the number of impressions, the click-throughs, the conversions, the amount of hover time, etc. of a particular portion of the first results page such as, but not limited to, a content module.

FIG. 4C depicts that the data contained in the search logs can be associated in such a way that the performance metrics 450 can be broken down for particular components of the page recipe and effectiveness of page recipes can be compared on a component-by-component basis rather than on the page as a whole. Associating the performance metrics 450 with a page recipe version 404 may require a time lapse between creating the page recipe version and rendering the results page in order to obtain such response statistics. Logging module 130 may also collect audit trail data for tracking changes to recipes and deployments to production for disaster recovery and rollback control. As shown in FIG. 2, a reporting module 132 can also communicate with logging module 130 to allow a user, administrator, or other third party to access search logs, e.g., as a basis for business analytics.

Turning back to FIG. 3, the next time a search request for the same search query is received, the process proceeds similar to that described above, but at 306, proceeds to 314 where the optimization engine 126 accesses existing recipe versions 404 related to that search query 402. At 316, optimization engine 126 determines whether any page recipes need to be added to address any new demographic conditions. Further, optimization engine 126 can choose to modify an existing page recipe version based on observations in performance metrics 450.

In one embodiment, a page recipe version 404 can be compared to a base page recipe to determine whether one or more components result in an increase or decrease in a performance metric 450. In addition, the optimization engine 126 then accesses past performance related to each page recipe version to determine whether an increase or decrease occurred and make determinations of what changes in components of instructions 408 are likely to produce an increase in performance metrics. Modifications can include, but are not limited to, changes in content source, amount of content or location of one or more content modules included in the definition 408 as well as changes to one or more page properties.

For example, if an existing page recipe version performs worse than a base page recipe, optimization engine 126 can create a new page recipe version that modifies the page recipe instructions of the existing page recipe version to see if the next page recipe version obtains higher performance metrics than the existing page recipe version. On the same note, even if an existing page recipe version performs better than a base page recipe, the optimization engine 126 may choose to randomly test existing page recipe version to see if a new page recipe version performs even better. The optimization engine 126 can be testing two or more page recipe versions for the same search query and demographic conditions at the same time to perform parallel optimization.

Thus, using metric comparison and/or random testing, the optimization engine 126 can then determine the factors (e.g., content of modules, location of modules on results page, amount of content of modules on results page), that likely influence increases or decreases in the performance metrics, and create modified recipe versions accordingly. When the optimization engine 126 identifies a page recipe version that results in an increase in performance metrics, it may delete a previous version for a particular demographic condition 406. Alternatively, as shown in FIG. 4A, two or more page recipe versions may be saved corresponding to a demographic condition so that statistical analysis can be performed to identify the factors that influence performance metrics. For example, in one embodiment, one page recipe version may be used a certain percentage of the time to test its effectiveness as compared to the other page recipe version for the same demographic criteria.

At 309, the optimization engine 126 then sends the modified recipe versions to router 118, which can, in some embodiments, include generating a page recipe. At 310, the front end module 104 generates a results page, which is rendered at a client. At 312, the optimization engine 126 continues to monitor performance metrics to optimize subsequent requests. As discussed above, the optimization engine 126 continues optimizing page recipes based on performance metrics over time.

The optimization engine 126 can also be connected to other various components and can be viewed, in one sense, as a central hub through which these other components can be accessed. Components to which optimization engine 126 are connected include a data store 134 and source configuration management 136. Data store 134 includes one or more storage devices for storing page recipes 400 and/or page recipe components that are managed and/or accessed by optimization engine 126. As such, data store 134 includes one or more storage devices that can be local or remote to optimization engine 126, for example, via a file system, relational database management system, webservice, and the like.

Optimization engine 126 also integrates data store 134 with source configuration management 136 for allowing user developers to create base page recipes and/or page recipe versions and for storing those page recipes in data store 134 for deployment to router 118. Source configuration management 136 includes a combination of source control, configuration combination and deployment strategy. In one embodiment, the source configuration management 136 can be remote from optimization engine 126 so that different source configuration management systems can be used (e.g., CVS, SourceSafe, Subversion, etc.). Further, embodiments of the invention may include different source configuration management "levels" to be assigned to users accessing system 100, such as open access, relaxed access, or strict access.

Optimization engine 126 can include one or more development environments 138 that can be accessed by a user to develop page recipe versions and/or components independently of the optimization methods of the present invention. The development environment 138 of optimization engine 126 allows developer users to design, define, and store changes to page recipes, such as, but not limited to, creating, removing, editing, running, overriding, previewing, promoting, publishing, concurrent development of, syndicating, and the like, of page recipe versions and/or tests, or components thereof. Developer environment 138 allows developer user to isolate their work from others in the same development group, or others in other development groups. Edited page recipe versions can also be previewed directly from their development environment 138 using either a "preview-only" configured router 118 or specific preview parameters in the front end module 104. Likewise, prior to publishing, preview requests can be made directly to the router cache 124 via the front end module 104 as a final check prior to going live. Developer environment 138 also has the ability to cache versions of page recipes, which are identifiable by version ID and developer user ID. New page recipe versions can be compared to old page recipe versions and either one deleted so that multiple versions of the same page recipe are not stored.

In one embodiment, source configuration management plug-ins are used to allow optimization engine 126 to integrate source control and revision control systems. This allows version management and collision detection to be delegated to pre-existing systems that are already configured to perform this function. Management of collisions will be allowed for with optimization engine 126 APIs. Thus, multiple developers can safely work in parallel. In one embodiment, source configuration management plug-ins are invoked when a developer users "finalizes" a page recipe, as opposed to when the page recipe is simply saved. Various source configuration management plug-in implementations can be used, as understood by those of skill in the art.

In one embodiment, optimization engine 126 can access storage functionality of third party content management system 140. In one embodiment, system 100 could delegate storage functionality totally to these third party content management 140, in which embodiments, such functionality is possible, such as, but not limited to, parallel development, independent development, version divergence, and the like.

Finally, optimization engine 126 can access tools/scripts 142 to access additional functionality as necessary. In addition, optimization engine 126 includes an administrative module 144 configured to allow varying levels of access to users to optimization engine 126 and components to which the optimization engine 126 is connected. Such level of access can determine, for example, whether a user is able to access developer environment 138 to develop one or more page recipes.

While system 100 is shown as a number of distributed components, it will be appreciated that each component may represent a software module located on a separate hardware device and accessed by network calls. In yet another embodiment, the components of system 100 may represent software modules configured as part of a single software application. In still another embodiment, two or more software modules may be integrated into a single application while other components of system 100 are located on remote hardware devices. In embodiments where optimization engine 126 accesses a component via a network call, the component provides an interface into APIs in the optimization engine 126.

In one embodiment, system 100 includes a single optimization engine 126 and a number of distributed routers 118. In another embodiment, one or more read only optimization engines 126 may also communicate with a primary optimization engine 126 since state information will not be stored on any single optimization engine 126. Thus, potentially numerous routers 118 can be deployed. The optimization engine 126 and router 118 may be deployed as individual web applications. However, either or both optimization engine 126 and router 118 may be used as a local java library. Also, in one embodiment, router 118 has the ability to directly load a page recipe from local storage, which enables the front end module 104 to have a redundant router library in place locally so that if the optimization engine 126 becomes unavailable the front end module 104 will still have request receiving and page rendering capabilities.

Figure 5:
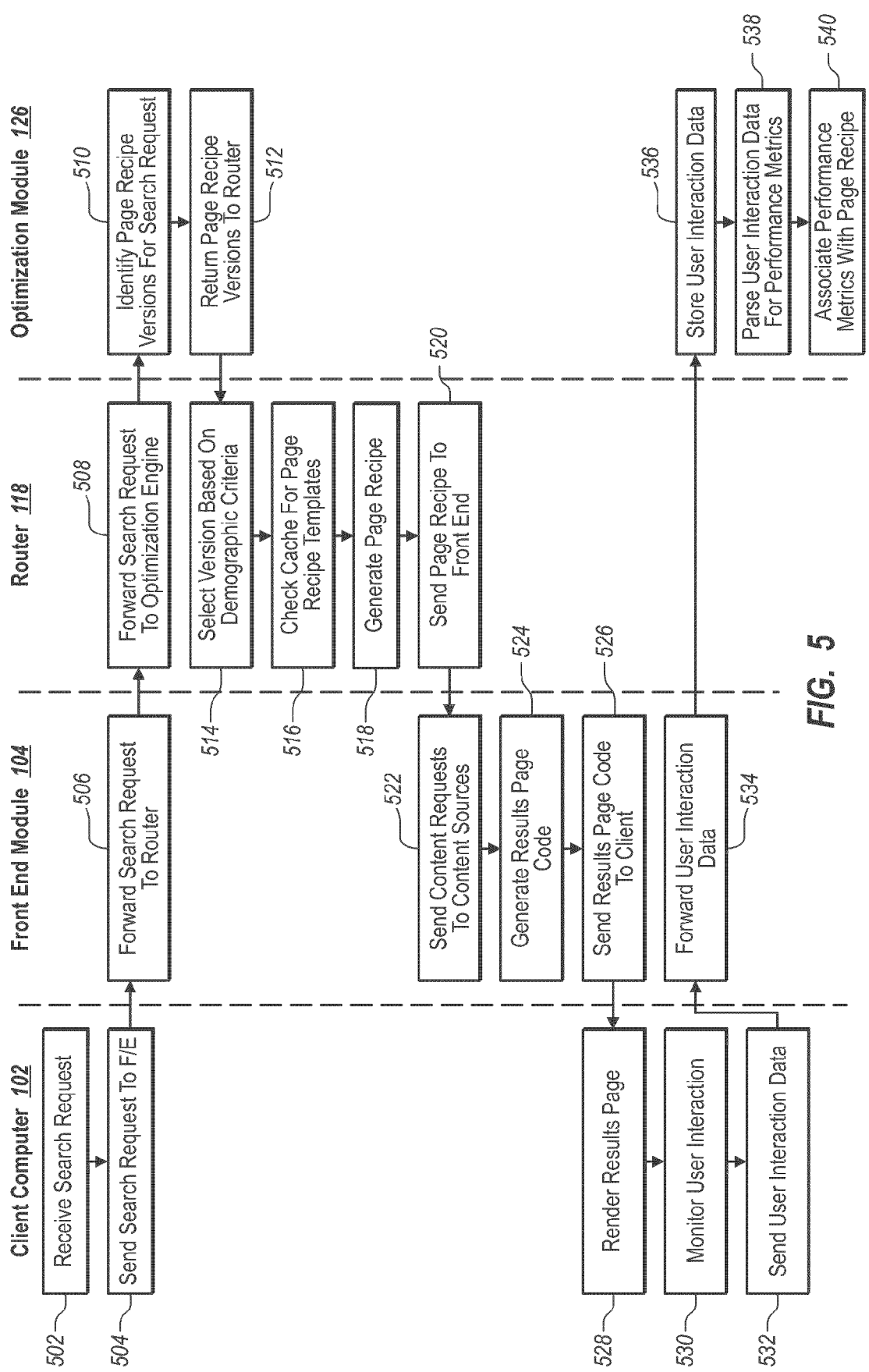
FIG. 5 illustrates an exemplary method for providing content in response to a search request, according to one embodiment of the invention.

Turning to FIG. 5, an exemplary method that illustrates the communication between client 102, front end module 104, router 118, and optimization engine 126 is illustrated. At 502, client 102 receives an initial search request from a user. At 504, the search request is sent to front end module 104. At 506, the front end module 104 forwards the search request to router 118.

If the search request is to be optimized, at 508, the router 118 sends the search request to the optimization engine 126. Ultimately, the search request, user demographic information, and/or classification information is sent to optimization engine 126, whether bundled together or sent in separate transmissions. At 510, the optimization engine 126, depending on whether the search request is the first one for a particular search query or whether the search query has been received before, the optimization engine 126 identifies page recipe versions associated with the search query. (The details of how the page recipe versions are identified are described above with reference to FIG. 4A.) At 512, the optimization engine 126 returns the page recipe versions to router 118.

At 514, router 118 uses a rules engine 120 to select the page recipe version that best fits the rules (i.e., demographic conditions) of the search request. If the page recipe version cites instructions on generating a page recipe, at 516, page recipe generator 115 at router 118 checks the cache 124 for templates of components of the identified page recipe version. It will be appreciated that templates of a page recipe or modules may be stored in cache 124 or otherwise accessed locally (e.g., from a local file system) at router 118 to quickly access the most frequently used templates.

At 518, recipe generator 115 then constructs a page recipe using one or more pre-configured templates stored in the cache 124 at router 118. If a pre-configured template is not available, recipe generator 115 at router 118 generates the page recipe based on criteria defined in instructions 408 of user description 404. Recipe generator 115 makes any other modifications as dictated by the selected page recipe version.

If the page recipe is already provided by the optimization engine 126, 516 and 518 may not need to be performed. The identified page recipe includes page properties as well as one or more content module definitions. The content module definitions define the amount of content, location and one or more content sources 108 of each content module.

At 520, router 118 sends the page recipe to front end module 104. At 522, front end module 104 sends content requests to one or more content sources 108 to provide the content required to render a complete results page. At 524, front end module 104 generates results page code for rendering a page. At 526, the front end module 104 sends the results page code to client 102. At 528, a browser application at the client 102 renders the results page code to display the results page.

As mentioned above, the optimization engine 126 continually monitors performance metrics to determine whether modifications need to be made to one or more page recipes. As such at 530, client computer 102 monitors user interactions with the results page. At 532, client computer 102 sends the user interaction data to front end module 104. At 534, response module 131 at front end module 104 receives the user interaction data and sends the data to the logging module 130. It will be appreciated that the user interaction data can be sent to the optimization engine 126 in various ways including bypassing the front end module 104. Various methods for transmitting user interaction data (or web analytics) can be implemented and will be understood by those of skill in the art.

At 536, logging module 130 stores the user interaction data. At 538, logging module 130 parses the user interaction data for performance metrics that are included in the user interaction data. At 540, the performance metrics are associated with the page recipe components as shown in FIG. 4B in order to determine the effectiveness of the page recipe, i.e., determine whether there was an increase or decrease in performance metrics compared with another page recipe for a similar or same search query.

Those of skill in the art will recognize that the present invention expands conventional search capabilities by gathering and analyzing search metrics to improve the layout of search results pages that are presented to users, as well as identifying query clusters and other relevant factors that can be used to optimize search result pages. An additional benefit of the present invention is that it increases revenue for business and product owners while at the same time minimizing the effort required for business and product owners to develop new member offerings or revenue opportunities.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions include, for example, instructions and data which cause a general purpose computer, special purpose computer, or special purpose processing device to perform a certain function or group of functions. Although the subject matter has been described in language specific to content module features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer system, a method for providing content to be displayed to a user in response to a search request, the method comprising:
   identifying two or more versions of a first page recipe, each identified version comprising one or more page properties and two or more content module definitions, the content module definitions defining an amount of content to be displayed in a content module to be displayed on a results page, the location of the content module to be displayed on the results page, and a content source from which to obtain content to be displayed in the content module, wherein at least one of the content module definitions identifies the at least one content source associated with at least one category, wherein the page properties and content module definitions of each identified version of the first page recipe are different so as to generate a different results page depending on which version of the first page recipe is selected;
   identifying a search request including a search query from a first client;
   identifying at least one category associated with the search query;
   automatically selecting one of the two or more versions of the first page recipe based on at least the at least one category to generate a rendered results page to be sent to the first client, the rendered results page including two or more content modules to be displayed on the rendered results page as defined by the selected version of the first page receipt; and
   displaying the rendered results page on a monitor of the computer system.

2. The method as recited in claim 1, further comprising receiving user interaction data identifying one or more performance metrics associated with the two or more content modules of the selection version of the first page recipe.

3. The method as recited in claim 2, further comprising determining whether the performance metrics associated with the two or more content modules of the selected version of the first page recipe exhibit an increase in performance metrics as compared to another version of the first page recipe for the same search request.

4. The method as recited in claim 3, further comprising, if the performance metrics associated with the two or more content modules of the selected version of the first page recipe exhibit an increase in performance metrics as compared to another version of the first page recipe for the same search request, using the selected version of the first page recipe again in response to a subsequent same search request.

5. The method as recited in claim 4, further comprising altering at least one of the amount of content, location, or content source of at least one of the content module definitions of the selected version of the first page recipe to generate a new version of the first page recipe and using the new version of the first page recipe in response to a subsequent same search request.

6. The method as recited in claim 1, further comprising associating each identified version of the first page recipe with a demographic condition.

7. In a computer system, a method for providing content to be displayed to a user in response to a search request, the method comprising:
   identifying two or more versions of a first page recipe, each identified version of the first page receipt being associated with a demographic condition, each identified version of the first page recipe comprising one or more page properties and two or more content module definitions, the content module definitions defining an amount of content to be displayed in a content module to be displayed on a results page, the location of the content module to be displayed on the results page, and a content source from which to obtain content to be displayed in the content module, wherein at least one of the content module definitions identifies the at least one content source associated with at least one category, wherein the page properties and content module definitions of each identified version of the first page recipe are different so as to generate a different results page depending on which version of the first page recipe is selected;

identifying a search request including a search query from a first client:

identifying a first demographic condition associated with the search request;

automatically selecting one of the two or more versions of the first page recipe based on at least the at least one category and the first demographic condition to generate a rendered results page to be sent to the first client, the rendered results page including two or more content modules to be displayed on the rendered results page as defined by the selected version of the first page receipt; and displaying the rendered results page on a monitor of the computer system.

8. The method as recited in claim 7, wherein the first page recipe is maintained in a data structure that associates other page recipes, each page recipe associated with the same search request, but for different demographic conditions.

9. The method as recited in claim 8, wherein each page recipe is stored as a set of instructions for generating a page recipe identifying a base page recipe and changes to be made to the base page recipe.

10. The method as recited in claim 8, wherein each page recipe is stored as a fully generated page recipe.

11. The method as recited in claim 7, further comprising receiving user interaction data identifying one or more performance metrics associated with the two or more content modules of the first version of the first page recipe.

12. The method as recited in claim 11, further comprising determining whether the performance metrics associated with the two or more content modules of the first version of the first page recipe exhibit an increase in performance metrics as compared to another version of the first page recipe for the same search request.

13. The method as recited in claim 12, further comprising, if the performance metrics associated with the two or more content modules of the first version of the first page recipe exhibit an increase in performance metrics as compared to another version of the first page recipe for the same search request, using the same version of the first page recipe again in response to a subsequent same search request.

14. The method as recited in claim 13, further comprising altering at least one of the amount of content, location, or content source of at least one of the content module definitions to generate a new version of the first page recipe and using the new version of the first page recipe in response to a subsequent same search request.

15. A system configured to supply content to be displayed to a user in response to a search request, the system comprising:

one or more computers having memory and at least one processor comprising:

a front end module configured to:

receive a search request including a search query from a client, generate a rendered results page from a first version of a first page recipe, the first page recipe having two or more versions, each identified version comprising one or more page properties and two or more content module definitions, the content module definitions defining an amount of content to be displayed in a content module to be displayed on a results page, the location of the content module to be displayed on the results page, and a content source from which to obtain content to be displayed in the content module, send requests to one or more content sources for content, receive content from the one or more content sources to incorporate in the rendered results page, send the rendered results page to the client, and receive performance metrics associated with user interaction with the rendered results page from the client; and an optimization engine associated with the front end module, the optimization engine configured to:

identify the first version of the first page recipe based on demographic conditions; and determine whether the performance metrics associated with the rendered results page exhibit an increase in performance metrics for the first version of the first page recipe as compared to another version of the first page recipe for the same search request, and, if so, use the same fist version of the first page recipe in response to a subsequent same search request.

16. The system as recited in claim 15, further comprising a router communicating with the front end module and the optimization engine, the router configured to receive instructions from the optimization engine and to generate the first version of the page recipe from one or more page recipe templates stored at the router.

17. The system as recited in claim 15, wherein the optimization engine is further configured to:

alter at least one of the amount of content, location, or content source of at least one of the content module definitions of the first version of the first page recipe to generate a new version of the first page recipe; and use the new version of the first page recipe in response to a subsequent same search request.

18. The system as recited in claim 15, wherein the optimization engine is further configured to associate one or more page recipes for the same search request for various demographic conditions.

19. The system as recited in claim 15, wherein the front end module is further configured to:

identify at least one category associated with the search query; and identify at least one content source associated with the at least one category, wherein at least one content module of the first version of the first page recipe incorporates the at least one content source.

* * * * *